Sept. 4, 1928.  H. F. SINNING  1,683,312
CRANK CASE HEATING DEVICE
Filed Dec. 20, 1926   2 Sheets-Sheet 1
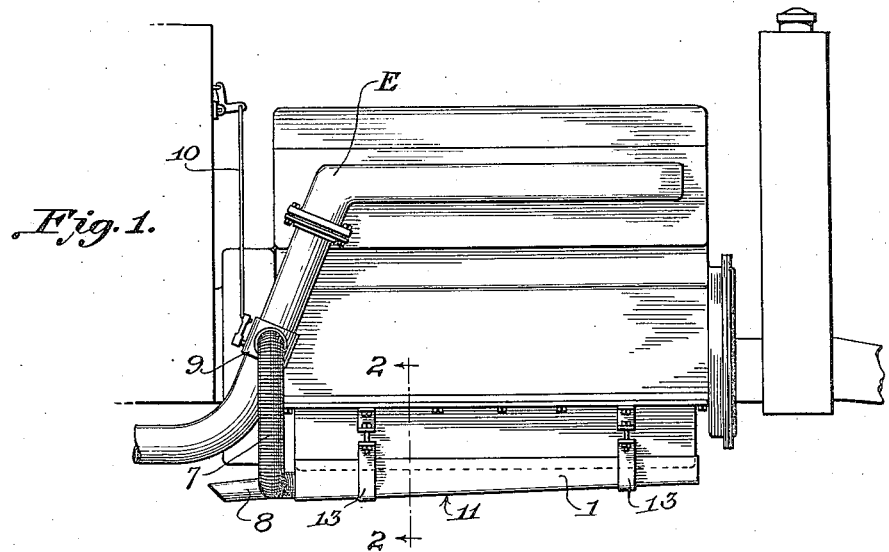
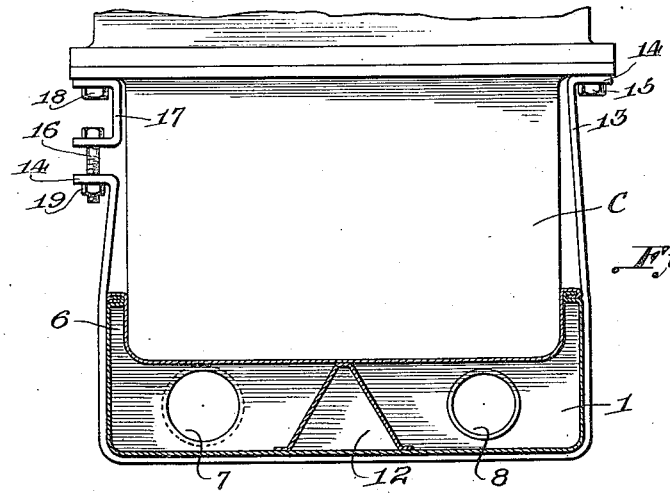
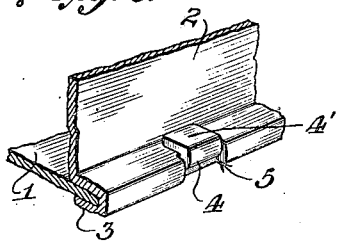
Inventor
Henry F. Sinning.
By William C. Sinton.
Attorney Sept. 4, 1928.
H. F. SINNING
CRANK CASE HEATING DEVICE
Filed Dec. 20, 1926
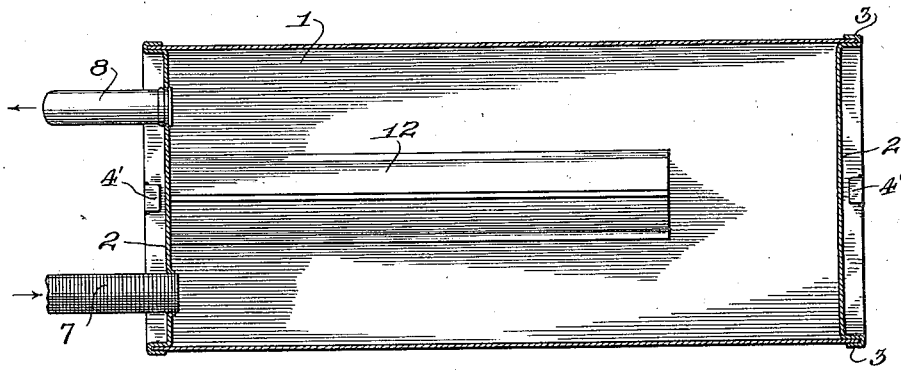
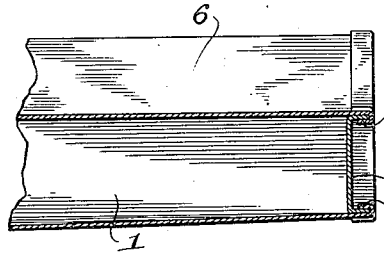
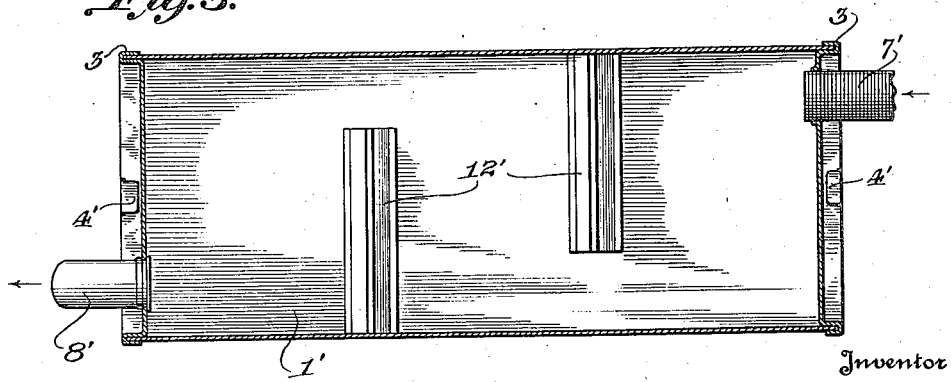

Patented Sept. 4, 1928.

1,683,312

UNITED STATES PATENT OFFICE.

HENRY F. SINNING, OF GRUNDY CENTER, IOWA.

CRANK-CASE-HEATING DEVICE.

Application filed December 20, 1926. Serial No. 156,029.

This invention relates to improvements in crank case heating devices, having for an object to provide such a device preferably for use upon the engines of motor driven vehicles, whereby the lubricating oil contained in the crank case will be prevented from congealing or thickening during cold or frigid weather and thereby, render its circulation and distribution to the moving engine parts unsatisfactory and oftentimes impossible, the device functioning to maintain the lubricating oil at a free flowing consistency and hence, ensuring proper lubrication of the engine parts and consequently, avoiding the incident difficulties of faulty lubrication, such as broken oil circulating pump parts, burnt bearings and the like.

It is also an object of the invention to provide a crank case heating attachment wherein condensed vapors, which will collect and partially mix the best of oil and such as are commonly experienced during the operation of an internal combustion engine and partially cause what is generally known as "crank case dilution" will be prevented from congealing or freezing within the equipped crank case and thereby, bring about the hazards of faulty oil distribution and engine lubrication.

Yet another and equally important object of the invention is to provide a heating device of the character mentioned, the construction of which will permit of its installation upon practically any form or design of internal combustion engine crank case without material alteration or modification of the same and which, when installed, will be securely and immovably positioned with respect to the crank case, thus avoiding rattling or other shifting movement and when desired, can be quickly and conveniently removed, as when the draining or removal of the crank case become necessary.

Other objects of the invention will be in part obvious and in part pointed out hereinafter.

In order that the invention and its mode of operation may be readily understood by those skilled in the art, I have in the accompanying illustrative drawings and in the detailed following description based thereupon, set out several embodiments of the invention.

In these drawings:

Figure 1 is a side elevation of the heating devices as applied to the crank case of an automobile engine, Figure 2 is a cross sectional view of the heating device taken on the line 2—2 of Figure 1 showing the crank case of the engine in elevation, Figure 3 is a horizontal sectional view through the heating device, Figure 4 is a vertical detail sectional view, Figure 5 is a sectional view similar to Figure 3 of a slightly modified form of the invention, and Figure 6 is a detail sectional perspective view.

Having more particular reference to the drawings in connection with which like characters of reference designate corresponding parts throughout, the improved crank case heating device may be stated to consist of a hollow pan like body portion generally indicated for convenience by the numeral 1, said body being of pressed steel construction and having the opposite end walls 2 thereof secured to the adjacent portions of its sides by forming marginally arranged flanges 3 in the former and engaging the adjacent portions of the side walls and bottom in said flanges and then pressing said flanges about the engaged portions of the side walls and the bottom whereby to provide a fluid tight jointure; the opposite ends of the bottom of the body portion being formed with longitudinally disposed tongues 4 which are adapted to be passed through blocks or openings 5 formed in adjacent portions of the flanges 3 of said end walls 2 and bent thereover as indicated by the numeral 4' in Figure 6. Thus, it will be appreciated that the upwardly and inwardly bent tongues 4 engaging through the openings 5 in said end walls 2 will afford means for positively preventing outward movement or displacement of the end walls with respect to the side walls of the pan-like body when subjected to stress of any sort.

The upper portions of the side walls and one end wall of the body portion 1 are extended upwardly for distances beyond the top of said body as is clearly illustrated in the Figures 1 and 2, such extended parts being designated by the numeral 6 and serving to embracingly and snugly receive the lower portion of the engine crank case C therein; said extended portions 6 of the side and end walls being hollow and communicating with the heating chamber formed within the hollow body portion 1.

In that form of the invention disclosed in the Figures 1 to 4 inclusive, it will be noted that inlet and outlet ports are formed in one end wall of the body portion 1, a flexible conduit or similar device 7 having one end thereof connected to and communicating with the inlet port of the body portion while an outlet or exhaust pipe 8 is connected to and extended from the outlet port of the body portion. The remaining end of the intake pipe 7 is connected to and communicates with one point of a multi-way coupling 9 interposed in the exhaust manifold E of the equipped combustion engine, said coupling 9 having a suitable form of control valve mounted therein and operable through a suitable connection generally designated by the numeral 10, whereby the operator of an equipped vehicle may cause the heated exhaust gases passing through the exhaust manifold E to be shunted into the flexible pipe 7 for introduction into the heating chamber of the hollow body portion 1, or if desired, may interrupt communication as between said inlet pipe 7 and the exhaust manifold E by re-adjustment of the control valve in a manner to cause the passage of said heated exhaust gases in their normal and usual course through the exhaust manifold E and by the intake pipe 7.

That the heated exhaust gases introduced into the heating chamber of the body portion 1 may be caused to thoroughly circulate through such body portion in order that the latter will be heated sufficiently, the bottom of such body portion is inclined as is indicated by the numeral 11 in the Figure 1, thus giving the body portion a longitudinal tapering formation, the forward end of which is of less depth or thickness than the rearward end, that is, that end of the body portion communicating directly with the inlet and outlet pipes 7 and 8 respectively.

Also, a longitudinally disposed baffle of substantially inverted V-shaped formation, designated by the numeral 12 is arranged within the heating chamber of the hollow body portion 1, as is shown in the Figures 2 and 3, the top and bottom portions of said baffle being joined by welding, soldering or other suitable means to adjacent portions or sides of the top and bottom of the hollow body portion 1, whereas the forwardly disposed end of the baffle 12 is spaced from the adjacent or forward end wall 2 of the device, hence permitting of a thorough circulation of the heated exhaust gases longitudinally through and forwardly of the heating chamber 1, then by the forward end of the baffle 12 and rearwardly and longitudinally through the heating chamber into the atmosphere by way of the outlet opening at the outlet pipe 8 connected thereto.

To support the hollow body portion 1 of the heating device in proper position with respect to the bottom of the crank case C, I provide a plurality of strap brackets 13, forming angular apertured seats 14 upon the opposite ends thereof, certain of the seats being engaged about the bolts 15 employed to connect and secure the crank case to the engine block, while the oppositely disposed apertured seats 14 are adjustably engaged over connecting bolts 16 secured to substantially U-shaped brackets 17, which in turn, are connected to the crank case securing bolts 18 upon the opposite side of the engine block. Thus, it will be understood that by adjusting the nuts 19 upon the connecting bolts 16, the strap brackets 13 embracingly engaging and disposed transversely of the crank case C may be placed under a tension sufficient to secure the snug and embracing engagement of the pan like body portion 1 with the lower portion of the crank case C in the manner shown in the Figure 2, whereby to prevent lateral or similar shifting movement.

In the Figure 5, I have shown a slightly modified form of crank case heater, wherein a pan like body portion 1' is provided, the opposite end walls of which are provided with inlet and outlet ports, the inlet ports being adapted to receive an exhaust gas inlet pipe 7' therein, while the outlet port in the opposite and remaining end walls receives an outlet pipe 8' therein, it being noted in this connection that the said pipes 7' and 8' are medially offset with respect to each other, whereby to insure of a full and complete circulation of the heated exhaust gases through the heating chamber of the pan like body portion. Furthermore, a plurality of transversely disposed substantially inverted V-shaped baffles 12' are fixedly arranged within the heating chamber of the hollow pan like body portion 1', the inner or free ends of these baffles being spaced with respect to the inner sides of the adjacent side walls of the body portion and further, being arranged in staggered or overlapping relationship so as to effect the tortuous passage of the heated exhaust gases to said heating chamber of the body portion and thus, secure or effect the heating of the device in an efficient manner prior to the discharge of the exhaust gases from the device by way of the outlet pipe 8'. This modified form as shown in Figure 5, is designed so as to fit those cars on which the exhaust pipe is located so as to lead from the front of the engine downward and then back, whereas the other forms are to be used on those cars on which the exhaust pipe leads downward from the rear of the engine. The device may also be modified in such a way as to combine the heater and the oil pan so as to form one solid piece.

From the foregoing, it will be understood that I have provided a simple, yet highly efficient means for effecting the heating of lubricating oil contained within the crank case of an equipped combustion engine in a free flowing state, irrespective of its subjection to low temperatures, which ordinarily, serve to bring about the congealing or thickening of such lubricating oils to such an extent as to render thorough distribution of the same over and upon the moving engine parts impractical and oftentimes impossible. Because of the pan-like formation of the hollow body portion, it will be understood that the same will embracingly receive the lower portion of the equipped engine crank case therein and thus, will heat a greater area of such crank case and consequently, insure the maintenance of the lubricating oil at a free flowing consistency. Furthermore, because of the novel arrangement and construction of the substantially inverted V-shaped baffles 12 and 12' employed in the heating chamber of the hollow body portion, it will be understood that the opposite sides of said body portion will be prevented from having relative movement, as by way of buckling or similar distortions with the application of stress and the subjection of the same to different temperatures. Therefore, the durability of the heating device will be materially enhanced and it will be enabled to successfully withstand for an indefinite period, the rough usage to which a device or attachment of its particular character is ordinarily subjected.

The manner in which the body portion of the heating device is secured to the lower portion of an equipped crank case, obviously, will permit of its ready installation or removal as may be required and likewise, the alteration or modification of those forms of crank cases now prevalent in the art will be unnecessary during the installation or attachment of the heating device.

Obviously, the flow of heated exhaust gases into the heating chamber of the hollow pan like body portion of the device may be regulated to the desired nicety by the operator of an equipped vehicle, merely by adjustment or regulation of the control valve in the multi way coupling 9 through medium of the operating connection 10 which is conveniently accessible from the operator's seat within said vehicle.

Manifestly, the construction shown is capable of considerable modification and such modification as is within the spirit of my claims, I consider within the spirit of my invention.

I claim:

1. An engine crank case heater comprising a closed fluid tight hollow pan having inlet and outlet ports therein, fluid tight hollow walls communicating with and extending upwardly from the sides and one end of said pan and adapted to snugly and embracingly receive the lower portion of the crank case, baffle means of substantially inverted V-shaped cross sectional formation received in said hollow pan having their upper and lower sides secured to adjacent portions of said pan and bracing the top and bottom thereof, and strap brackets embracingly engaged about bottom and sides of said pan and adjustably secured to portions of the engine.

2. An engine crank case heater comprising a closed fluid tight hollow pan adapted to snugly and embracingly receive the lower portion of the crank case, said pan having inlet and outlet ports therein communicating with the heating chamber formed in the same, a substantially cross sectionally V-shaped baffle arranged within the heating chamber of said pan having its opposite sides fixedly secured to adjacent portions of the pan and bracing the top and bottom of the same with respect to each other, and a plurality of strap brackets engaging the bottom and sides of said pan and adjustably secured to portions of the engine.

3. A crank case heater comprising a closed fluid tight hollow pan adapted to snugly and embracingly receive the lower portion of the crank case, said pan having spaced inlet and outlet ports formed in one wall thereof and communicating with the heating chamber provided within the same, a substantially cross sectionally V-shaped baffle arranged within the heating chamber of said pan between the ports, said baffle extending in proximity of the opposite ends of the pan and having its upper and lower portion secured to the adjacent portions of the latter for bracing the top and bottom of the pan with respect to each other, and a plurality of adjustable strap brackets secured to portions of the engine and embracing the bottom and sides of said pan.

In witness whereof I have hereunto set my hand.

HENRY F. SINNING.